(12) United States Patent
Barker et al.

(10) Patent No.: US 7,715,826 B2
(45) Date of Patent: May 11, 2010

(54) METHOD AND APPARATUS FOR ELECTRONIC MAILING OF DATA UTILIZING A DATA REFERENCE

(75) Inventors: Melanie Barker, Kanata (CA); Luis Estable, Gatineau (CA)

(73) Assignee: Research In Motion Limited, Waterloo (CA)

( * ) Notice: Subject to any disclaimer, the term of this patent is extended or adjusted under 35 U.S.C. 154(b) by 507 days.

(21) Appl. No.: 11/296,327

(22) Filed: Dec. 8, 2005

(65) Prior Publication Data

US 2007/0135095 A1 Jun. 14, 2007

(51) Int. Cl.
*H04L 12/58* (2006.01)

(52) U.S. Cl. ............... 455/412.1; 455/574; 455/410; 455/419; 709/227; 709/248; 709/206; 715/700

(58) Field of Classification Search ............... 455/412.1
See application file for complete search history.

(56) References Cited

U.S. PATENT DOCUMENTS

| 6,405,225 | B1 | 6/2002 | Apfel et al. | |
|---|---|---|---|---|
| 7,249,198 | B1* | 7/2007 | Creemer | 709/248 |
| 2001/0054073 | A1* | 12/2001 | Ruppert et al. | 709/206 |
| 2002/0016823 | A1* | 2/2002 | Ueno et al. | 709/206 |
| 2003/0006919 | A1* | 1/2003 | Collins et al. | 341/87 |
| 2003/0084106 | A1* | 5/2003 | Erev et al. | 709/206 |
| 2004/0266417 | A1* | 12/2004 | Janas | 455/419 |
| 2005/0216855 | A1* | 9/2005 | Kopra et al. | 715/767 |
| 2006/0129633 | A1* | 6/2006 | Potluri et al. | 709/203 |
| 2006/0223593 | A1* | 10/2006 | Ishak | 455/574 |

FOREIGN PATENT DOCUMENTS

| WO | 0248900 | 6/2002 |
|---|---|---|
| WO | WO 02/47351 | 6/2002 |
| WO | WO 03/013080 | 2/2003 |
| WO | WO 2005/109820 | 11/2005 |

OTHER PUBLICATIONS

European Search Report dated Apr. 19, 2006.
CIPO first Office Action, CA 2,570,883 dated Feb. 27, 2009.
Canadian Application No. 2,570,883, Examiner's Requisition under subsection 30(2) of the Patent Rules - Office Action, dated Nov. 24, 2009.

* cited by examiner

*Primary Examiner*—Rafael Pérez-Gutiérrez
*Assistant Examiner*—German Viana Di Prisco
(74) *Attorney, Agent, or Firm*—Moffat & Co.

(57) ABSTRACT

A mobile device for electronic mailing of data utilizing a data reference, the mobile device having: a communications subsystem for communicating with a wireless gateway; a user interface; a processor interacting with the user interface and the communications subsystem; an electronic mail application adapted to run on the processor; a data application adapted to run on the processor; and memory adapted to be accessed by the electronic mail application and the data application, the memory storing a data reference identifier for data in the data application, the data reference identifier capable of identifying the data on a data server remote from the mobile device, wherein the data application is adapted to interact with the electronic mail application to send data in an electronic mail message, and wherein the data is replaced in the electronic mail message with the data reference identifier.

16 Claims, 5 Drawing Sheets

METHOD AND APPARATUS FOR ELECTRONIC MAILING OF DATA UTILIZING A DATA REFERENCE

FIELD OF THE APPLICATION

The present application relates to electronic mail sent to and received from a mobile device, and in particular to electronic mail on a mobile device synchronized with a shared data server.

BACKGROUND

Mobile devices are used for numerous functions including electronic mail. However, as mobile devices become more sophisticated, users use the mobile device for a variety of additional functions. For example, a user may be able to generate a memo for storing information such as meeting minutes, details of telephone conversations, grocery lists or whatever else the user may need to create a memo for. Other forms of data besides memos can also be created on the mobile device.

One limitation on mobile data devices currently is the sharing of data content with others. For example, if a user creates a series of tasks that are required to be accomplished in a memo, the user may wish to share these tasks with other individuals. Currently this requires the copying of the data from the data application and pasting it into an electronic mail application in order to send it to various recipients.

Once the data is pasted into the electronic mail message, it is then sent over the air to a wireless gateway. This requires network bandwidth in order to transfer the data, along with battery power to operate the transmitter at the wireless device.

Similarly, if the user is receiving data from other sources, and would prefer to store them in the data application (such as a memo application), currently the user must copy the data from the electronic mail format and paste it into the data application in order to store it in the data system. Further, the data must be transferred over the air from the wireless gateway, again requiring sufficient bandwidth to transfer the data.

BRIEF DESCRIPTION OF THE DRAWINGS

The present apparatus and method will be better understood with reference to the drawings in which.

DETAILED DESCRIPTION OF THE DRAWINGS

Figure 1:
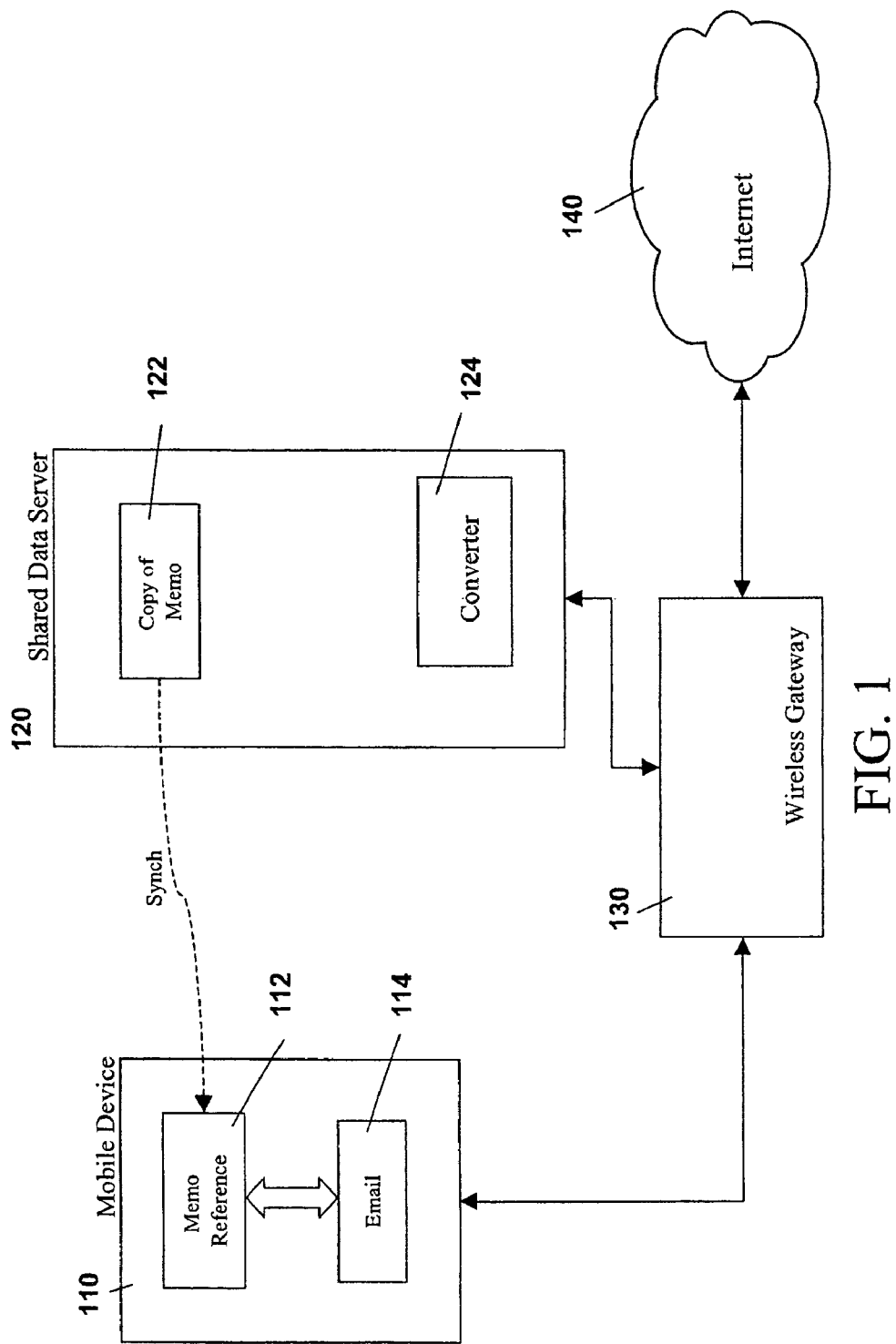
FIG. 1 is a block diagram of an exemplary system utilizing the present method and apparatus.

The present apparatus and method overcome the deficiencies of the prior art by providing a data application in which the data application can access the electronic mail application and in which specific data content can be electronically mailed directly from the data application.

In a preferred embodiment, the data content is stored on a shared data server and the mobile device periodically synchronizes with the shared data server. One skilled in the art will realize that synchronization can occur using a variety of means including over the air, serial connections such as USB or Bluetooth™, IrDA, or other synchronization methods. In this case, the data application would not send the data content over the air, but rather would send a reference to the data content. This saves network bandwidth and battery life on the mobile device.

In a preferred embodiment, the data application is an application for generating memoranda, and will be referred to herein as a memo application. The present system and method are however not meant to be limited to memo applications and other data applications are contemplated to be within the scope of the present apparatus and method.

The mobile device can also, in a preferred embodiment, receive data content such as memos through electronic mail. In this case, the data will be received by the electronic mail application, but the electronic mail application will have the capability of identifying that the particular electronic mail message contains data content for the data application and will thus be able to pass the content to the data application.

In this embodiment, the electronic mail application receives an electronic mail message with only a reference to the data content. The actual data is stored on a shared data server. In this case, the data application can store the reference until a synchronization occurs, at which time the user can have access to the data. If the user wishes to view the data immediately, then the mobile device can initiate a synchronization with the shared data server upon the user trying to access the data content in order to obtain the content.

As will be appreciated, the above method and apparatus therefore provide for a data application to have access to an electronic mail system for sending data content to recipients and further the data application receives content through the electronic mail application. In a preferred embodiment the data is sent across the network by reference only, thus saving network bandwidth and battery life for the receiver and transmitter on the mobile device.

The present application therefore provides a method for electronic mailing of data to and from a mobile device, said data being stored in a data server, the method comprising the steps of: replacing data in an electronic mail message with a reference identifier, said reference identifier capable of identifying the data on the data server; and sending the message between a wireless gateway and the mobile device.

The present application further provides a mobile device for electronic mailing of data utilizing a data reference, the mobile device comprising: a communications subsystem for communicating with a wireless gateway; a user interface; a processor interacting with said user interface and said communications subsystem; an electronic mail application adapted to run on said processor; a data application adapted to run on said processor; and memory adapted to be accessed by said electronic mail application and said data application, said memory storing a data reference identifier for data in said data application, said data reference identifier capable of identifying the data on a data server remote from said mobile device, wherein said data application is adapted to interact with said electronic mail application to send data in an electronic mail message, and wherein said data is replaced in said electronic mail message with the data reference identifier.

The present apparatus and method will be described in more detail below with reference to the figures. In the figures below, the data application described is a memorandum application. However, this is not meant to limit the scope of the present apparatus and method, and other applications would be evident to those skilled in the art. Non-exhaustive examples could also include pictures, tasks or other data.

Referring to FIG. 1, a mobile device 110 includes a data application such as memorandum application 112. The mobile device further includes an electronic mail application 114.

Mobile device 110, in a preferred embodiment, occasionally synchronizes with a shared data server 120. Synchronization can occur over the air through the radio frequency communications of the mobile device. Alternatively, synchronization can occur through a serial interface, such as universal serial (USB), or short-range wireless communications such as Bluetooth™ or IrDA. In the case of the serial connection or the short-range wireless communications, synchronization can occur with a user's desktop computer or other computer that has an established network interface.

In operation, mobile device 110 can periodically synchronize with shared data server 120. This could include, for example, when the mobile device is first turned on. Other alternatives include synchronization as events happen on the mobile device. They could also occur when the mobile device establishes a network connection with a particular network. Other alternatives for synchronization scheduling would be evident to those skilled in the art.

Shared data server 120 includes a data storage 122 which stores a copy of all of the data content required by mobile device 110. Using the memorandum example, all of the memos for the mobile device will be stored in the data storage area 122. Further, data storage area 122 will generate a reference identifying particular data content. This identifier can take on various forms, such as a numeric identifier, the title of the particular memorandum, other alphanumeric combinations, or other similar other identification means. As long as the identifier consumes less wireless resources to transmit than the data content and as long as the data server can map the identifier back to the particular data content, the choice of the particular form of an identifier is not essential.

Mobile device 110 further communicates with a wireless gateway 130. As will be appreciated by those skilled in the art, wireless gateway can generally include a base station, base station controller and other network components. The present apparatus and method are not meant to be limited to a particular wireless system and any wireless system in which a mobile device can communicate with a wireless gateway 130 is envisioned to be within the scope of the present application.

Wireless gateway 130 further communicates with shared data server 120 and as is explained in more detail below, is capable of receiving a reference from an electronic mail application 114 and using the references and a converter to insert the actual content in outgoing messages.

Once the wireless gateway 130 has converted the message into an appropriate format, the message can then be sent over a network such as the Internet 140 and to its ultimate recipient.

In the opposite direction, if the wireless gateway 130 receives a message in which the recipient is the user of mobile device 110, wireless gateway 130 can include means to identify that the electronic mail message includes data content. In this case, the message can be passed, first, to shared data server 120 which includes a data converter 124. Data converter 124 is capable of recognizing the particular data form and converting the data into a relevant format for a particular data application. In the case of a memorandum, the wireless gateway 130 will pass the memorandum within the electronic message to converter 124 and the converter 124 will then convert the data into the proper format for a memorandum and pass it to the data content application 122 for storage. The converter will then pass a unique identifier referring to the data content back to wireless gateway 130. Wireless gateway 130 can recompose the electronic mail message to include only the reference to the memorandum when the electronic mail is passed to mobile device 110.

Mobile device 110 receives the message at electronic mail application 114 and recognizes that there is a memo reference within the electronic mail document. This memo reference is passed to the data application 112, which stores the reference.

The mobile device can then obtain the content of the memorandum using the memo reference during the next synchronization. If the user wishes to see the contents of the memo right away, synchronization or partial synchronization can occur at the time that the user tries to open the memorandum for which the mobile device contains only a reference. Otherwise, if the user defers opening up the memorandum the mobile device can merely store the reference until the next synchronization occurs.

Figure 2:
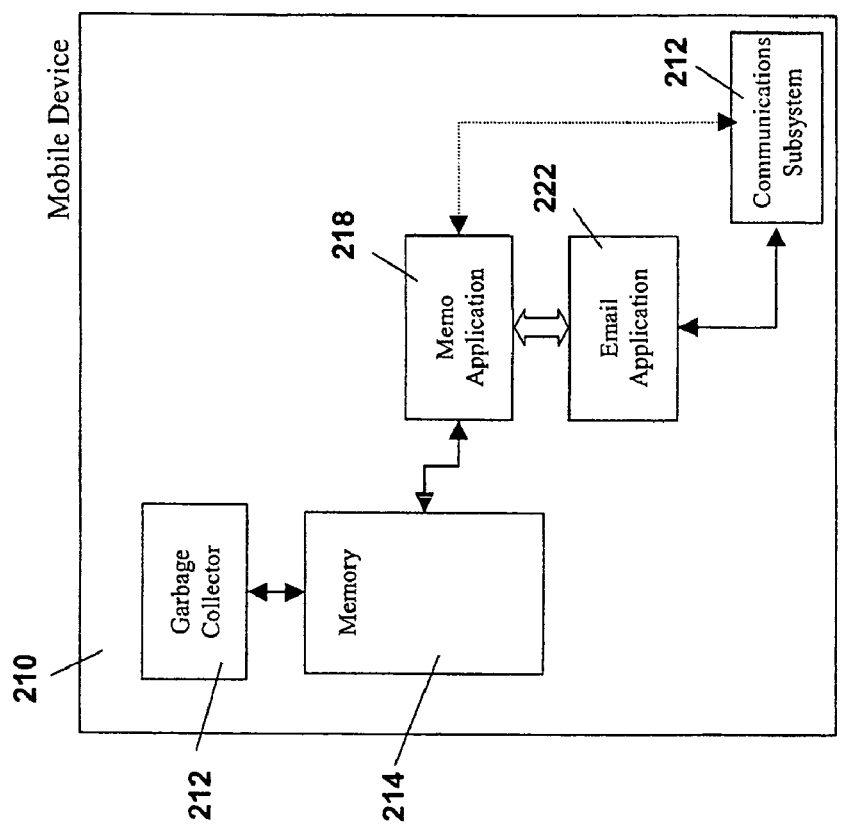
FIG. 2 is a block diagram of an exemplary mobile device utilizing the present method.

Reference is now made to FIG. 2. FIG. 2 shows a simplified mobile device in which various applications are highlighted in block diagram format. The mobile device 210 corresponds with mobile device 110 from FIG. 1.

Mobile device 210 includes a communication subsystem 212 for communicating with a wireless gateway such as wireless gateway 130 of FIG. 1. Mobile device 210 further includes memory 214 for storing data and content on the mobile device 210. As will be appreciated by those skilled in the art, a mobile device may not have a file structure but instead store data sequentially within the flash type memory structure. Due to technology and space limitations, memory 214 is often limited in size. Thus, mobile device 210 will preferably include a garbage collection application 216. Garbage collection application 216 will go through memory 214, and may strip the data content out of memory 214, leaving only the reference numeral. As will be appreciated, this will free memory 214 for other storage.

A memo application 218 is illustrated in FIG. 2. Other data content applications, as described above, could also be utilized. Further, an electronic mail application 220 is also illustrated.

Figure 3:
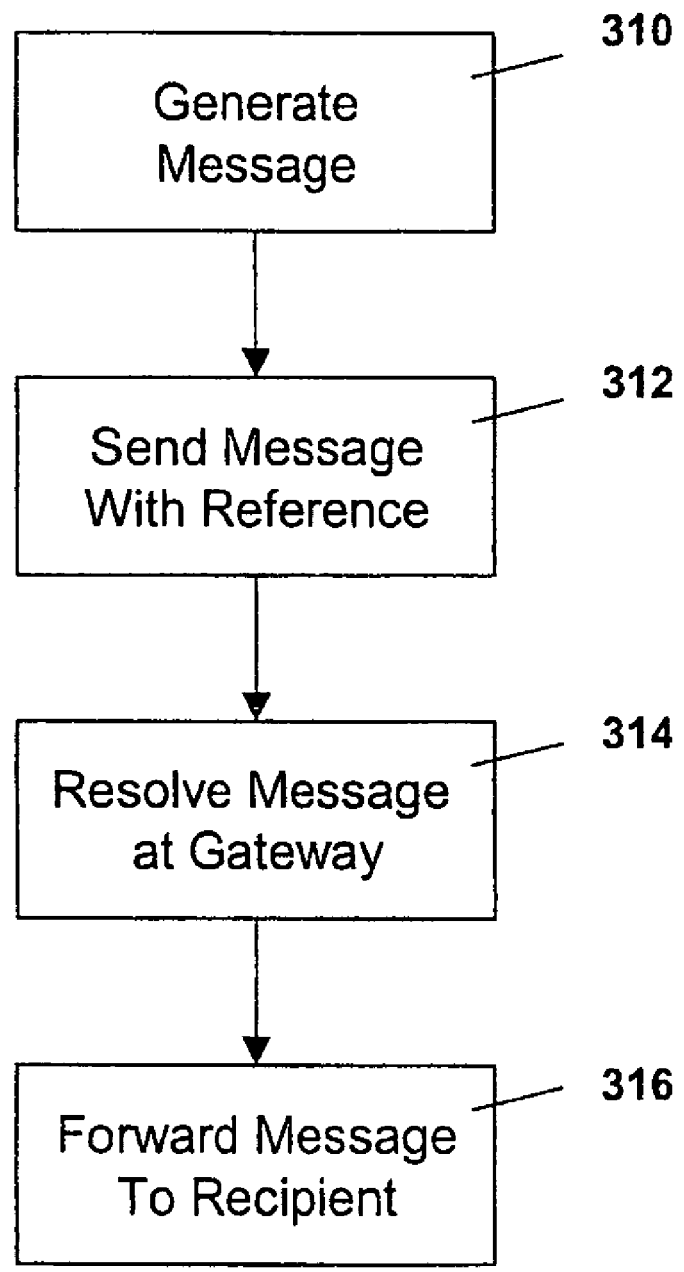
FIG. 3 is a flow chart of a mobile device sending data content.

Referring to FIG. 3, FIG. 3 illustrates a method of sending data content such as a memo from a mobile device 210 or 110. As illustrated in FIG. 3, a user from a data application such as a memo application can select the option of sending the content to a recipient. This could be done by allowing the application access to an address book on the mobile device to specify whom the data is to. Further, the interface may allow the selection of various options, for example, whether to attach the data as an attachment or to place the data within the body of the message. The mobile device thus generates a message in step 310.

The message and various options are then sent to the wireless gateway in step 312. As indicated above, the actual data is not sent in this step, but rather a reference to the data is sent over the air. This saves both the battery life of the mobile device because the transmitter on the mobile device does not need to operate for the same duration, and also saves network resources by reducing the bandwidth requirements for the sending of a message. At the wireless gateway the message is resolved. This is done by sending the reference that is currently in the electronic mail to the shared data server and receiving from the shared data server the data required for the message.

The wireless gateway then composes the message in a proper format and forwards it to its recipient over a network such as the Internet 140 as illustrated in FIG. 1. This is illustrated in step 316.

As will be appreciated, with reference to FIG. 2 and 3, step 310 requires interaction between the memorandum application and the email application in order to allow the message to be generated in the memorandum application but have access to the address book which is generally part of the electronic mail application and further to be able to compose a message and send it as an electronic mail message.

Figure 4:
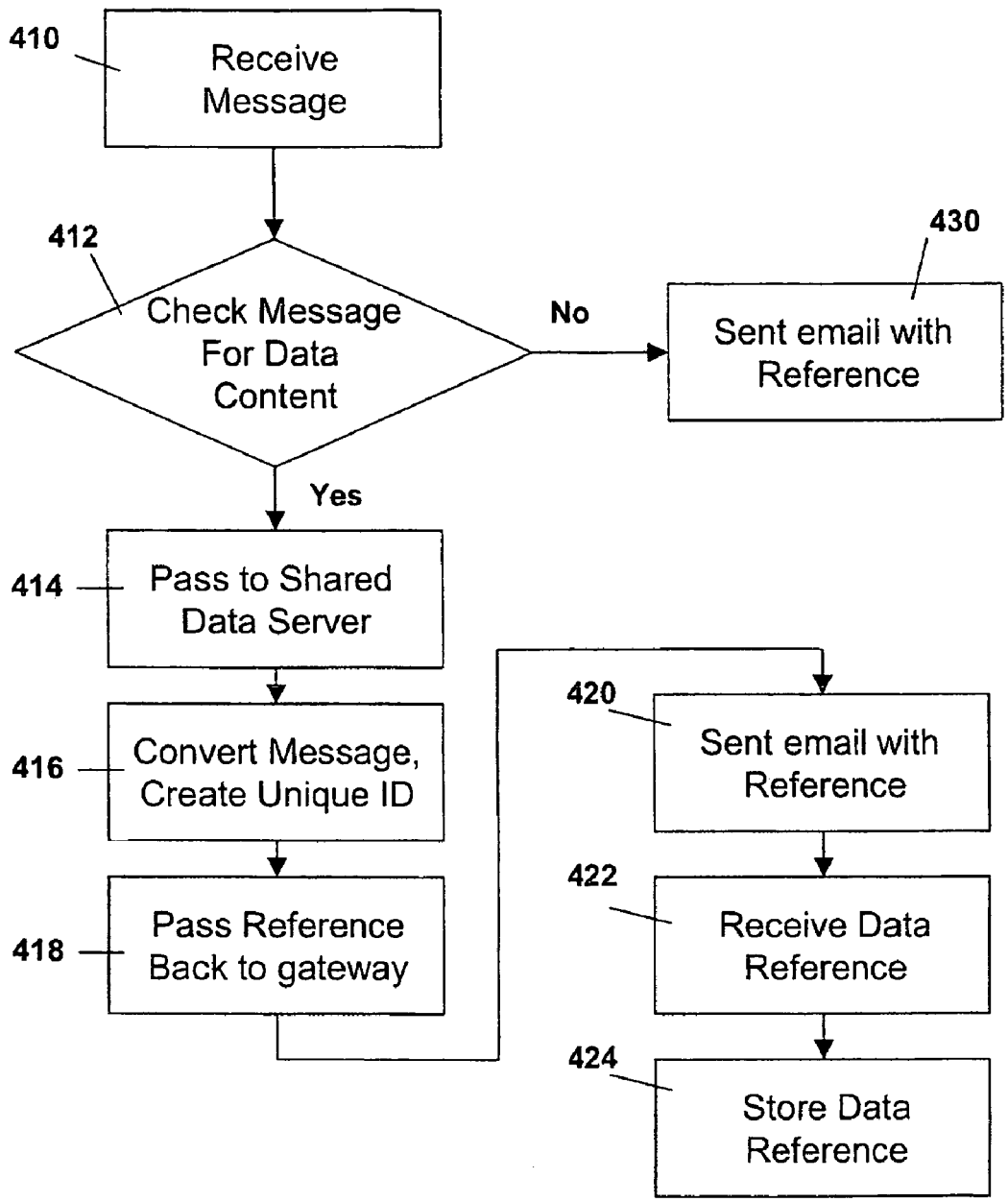
FIG. 4 is a flow chart of a mobile device receiving data content.

Referring to FIG. 4, FIG. 4 illustrates the reception of a message with data content. A wireless device such as wireless device 130 of FIG. 1 receives a message that includes data content. This might be identified by the format of the attachment to the electronic mail message. This is done in steps 410 and 412.

If, in step 412, it is discovered that data content does exist in the message, the message is first passed to the shared data server in step 414. The shared data server converts the message by striping the data content, creating a unique identifier in step 416 and passing the unique identifier back to the wireless gateway in step 418.

The electronic mail message is then sent to the mobile device with the reference rather than the data content in step 420.

The mobile device receives the email message in step 422 and recognizes that a data reference is included which is stored in a data application for future access in step 424.

As will be appreciated by those skilled in the art, if the message does not contain data content in step 412, the message is merely forwarded in step 430.

The above therefore provides for the sending and receiving data merely by sending and receiving unique reference identifiers to and from the mobile device, thereby saving network bandwidth and mobile device resources. Further, the above provides for the access to the electronic mail system from the data application, thereby reducing the number of steps that are required to be performed in order to share data content with others.

Figure 5:
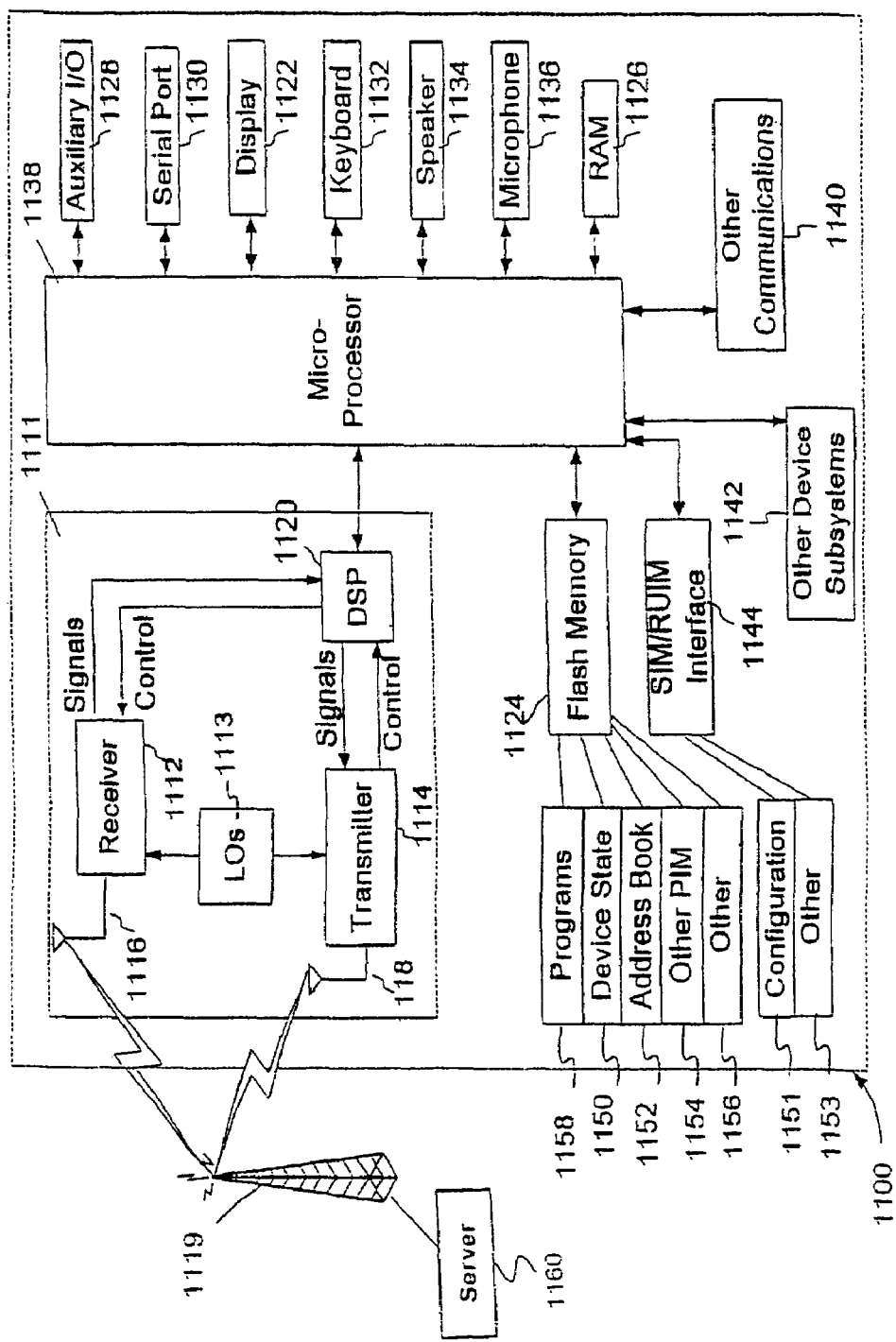
FIG. 5 is a block diagram showing an exemplary mobile device in more detail.

One skilled in the art will appreciate that many mobile devices could be used to implement the above. FIG. 5 illustrates an exemplary mobile device that could be used with the above method and system. Mobile device 1100 is preferably a two-way wireless communication device having at least voice and data communication capabilities. Mobile device 1100 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 1100 is enabled for two-way communication, it will incorporate a communication subsystem 1111, including both a receiver 1112 and a transmitter 1114, as well as associated components such as one or more, preferably embedded or internal, antenna elements 1116 and 1118, local oscillators (LOs) 1113, and a processing module such as a digital signal processor (DSP) 1120. As will be apparent to those skilled in the field of communications, the particular design of the communication subsystem 1111 will be dependent upon the communication network in which the device is intended to operate. For example, mobile device 1100 may include a communication subsystem 1111 designed to operate within the Mobitex™ mobile communication system, the DataTAC™ mobile communication system, GPRS network, UMTS network, EDGE network or CDMA network.

Network access requirements will also vary depending upon the type of network 1119. For example, in the Mobitex and DataTAC networks, mobile device 1100 is registered on the network using a unique identification number associated with each mobile device. In UMTS and GPRS networks, and in some CDMA networks, however, network access is associated with a subscriber or user of mobile device 1100. A GPRS mobile device therefore requires a subscriber identity module (SIM) card in order to operate on a GPRS network, and a RUIM in order to operate on some CDMA networks. Without a valid SIM/RUIM card, a GPRS/UMTS/CDMA mobile device may not be fully functional. Local or non-network communication functions, as well as legally required functions (if any) such as emergency calling, may be available, but mobile device 1100 will be unable to carry out any other functions involving communications over the network 1100. The SIM/RUIM interface 1144 is normally similar to a card-slot into which a SIM/RUIM card can be inserted and ejected like a diskette or PCMCIA card. The SIM/RUIM card can have approximately 64K of memory and hold many key configuration 1151, and other information 1153 such as identification, and subscriber related information.

When required network registration or activation procedures have been completed, mobile device 1100 may send and receive communication signals over the network 1119. Signals received by antenna 1116 through communication network 1119 are input to receiver 1112, which may perform such common receiver functions as signal amplification, frequency down conversion, filtering, channel selection and the like, and in the example system shown in FIG. 5, analog to digital (A/D) conversion. A/D conversion of a received signal allows more complex communication functions such as demodulation and decoding to be performed in the DSP 1120. In a similar manner, signals to be transmitted are processed, including modulation and encoding for example, by DSP 1120 and input to transmitter 1114 for digital to analog conversion, frequency up conversion, filtering, amplification and transmission over the communication network 1119 via antenna 1118. DSP 1120 not only processes communication signals, but also provides for receiver and transmitter control. For example, the gains applied to communication signals in receiver 1112 and transmitter 1114 may be adaptively controlled through automatic gain control algorithms implemented in DSP 1120.

Network 1119 may further communicate with multiple systems, including a server 1160 and other elements (not shown). For example, network 1119 may communicate with both an enterprise system and a web client system in order to accommodate various clients with various service levels.

Mobile device 1100 preferably includes a microprocessor 1138 which controls the overall operation of the device. Communication functions, including at least data and voice communications, are performed through communication subsystem 1111. Microprocessor 1138 also interacts with further device subsystems such as the display 1122, flash memory 1124, random access memory (RAM) 1126, auxiliary input/output (I/O) subsystems 1128, serial port 1130, keyboard 1132, speaker 1134, microphone 1136, a short-range communications subsystem 1140 and any other device subsystems generally designated as 1142;

Some of the subsystems shown in FIG. 5 perform communication-related functions, whereas other subsystems may provide "resident" or on-device functions. Notably, some subsystems, such as keyboard 1132 and display 1122, for example, may be used for both communication-related functions, such as entering a text message for transmission over a communication network, and device-resident functions such as a calculator or task list.

Operating system software used by the microprocessor 1138 is preferably stored in a persistent store such as flash memory 1124, which may instead be a read-only memory (ROM) or similar storage element (not shown). Those skilled in the art will appreciate that the operating system, specific device applications, or parts thereof, may be temporarily loaded into a volatile memory such as RAM 1126. Received communication signals may also be stored in RAM 1126. Further, a unique identifier is also preferably stored in read-only memory.

As shown, flash memory 1124 can be segregated into different areas for both computer programs 1158 and program data storage 1150, 1152, 1154 and 1156. These different storage types indicate that each program can allocate a portion of flash memory 1124 for their own data storage requirements. Microprocessor 1138, in addition to its operating system functions, preferably enables execution of software applications on the mobile device. A predetermined set of applications that control basic operations, including at least data and voice communication applications for example, will normally be installed on mobile device 1100 during manufacturing. A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 1119. In a preferred embodiment, the PIM data items are seamlessly integrated, synchronized and updated, via the wireless network 1119, with the mobile device user's corresponding data items stored or associated with a host computer system. Further applications may also be loaded onto the mobile device 1100 through the network 1119, an auxiliary I/O subsystem 1128, serial port 1130, short-range communications subsystem 1140 or any other suitable subsystem 1142, and installed by a user in the RAM 1126 or preferably a non-volatile store (not shown) for execution by the microprocessor 1138. Such flexibility in application installation increases the functionality of the device and may provide enhanced on-device functions, communication-related functions, or both. For example, secure communication applications may enable electronic commerce functions and other such financial transactions to be performed using the mobile device 1100. These applications will however, according to the above, in many cases need to be approved by a carrier.

In a data communication mode, a received signal such as a text message or web page download will be processed by the communication subsystem 1111 and input to the microprocessor 1138, which preferably further processes the received signal for output to the display 1122, or alternatively to an auxiliary I/O device 1128. A user of mobile device 1100 may also compose data items such as email messages for example, using the keyboard 1132, which is preferably a complete alphanumeric keyboard or telephone-type keypad, in conjunction with the display 1122 and possibly an auxiliary I/O device 1128. Such composed items may then be transmitted over a communication network through the communication subsystem 1111.

For voice communications, overall operation of mobile device 1100 is similar, except that received signals would preferably be output to a speaker 1134 and signals for transmission would be generated by a microphone 1136. Alternative voice or audio I/O subsystems, such as a voice message recording subsystem, may also be implemented on mobile device 1100. Although voice or audio signal output is preferably accomplished primarily through the speaker 1134, display 1122 may also be used to provide an indication of the identity of a calling party, the duration of a voice call, or other voice call related information for example.

Serial port 1130 in FIG. 5 would normally be implemented in a personal digital assistant (PDA)-type mobile device for which synchronization with a user's desktop computer (not shown) may be desirable. Such a port 1130 would enable a user to set preferences through an external device or software application and would extend the capabilities of mobile device 1100 by providing for information or software downloads to mobile device 1100 other than through a wireless communication network. The alternate download path may for example be used to load an encryption key onto the device through a direct and thus reliable and trusted connection to thereby enable secure device communication.

Other communications subsystems 1140, such as a short-range communications subsystem, is a further optional component which may provide for communication between mobile device 1100 and different systems or devices, which need not necessarily be similar devices. For example, the subsystem 1140 may include an infrared device and associated circuits and components or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

We claim:

1. A method for conveying data content to and from mobile devices storing data content in a shared data server, the method comprising steps of:

generating an electronic mail message from a sending data application executing on a sending mobile device, said sending data application being configured to exchange application related data content via a sending electronic mail application executing on said sending mobile device;

generating at the shared data server a reference identifier identifying the data content stored on the shared data server;

receiving the reference identifier from said shared data server;

the sending electronic mail application replacing data content in the electronic mail message with said reference identifier;

conveying the message over a wireless network infrastructure;

recognizing the reference identifier in an electronic mail message received at a destination mobile device; and a receiving email application executing on said destination mobile device passing the reference identifier automatically to a receiving data application executing on the destination mobile device, wherein the receiving data application displays data obtained from the data server upon selection of the data within the receiving data application.

2. The method of claim 1, further comprising resolving said message at a wireless gateway by replacing the reference identifier with the data content retrieved from the shared data server.

3. The method of claim 1, wherein the data application is a memorandum application.

4. The method of claim 3, wherein the data content is a memorandum.

5. The method of claim 1, wherein the data content is periodically deleted from each mobile device by the corresponding mobile device, wherein reference identifiers are left at each mobile device.

6. The method of claim 1, further comprising wireless gateway steps of:
   checking a received electronic mail message for data content;
   stripping data content from the message;
   passing the stripped data content to the shared data server;
   receiving from the shared data server a reference identifier for the stripped data content
   recomposing the electronic mail message to include the reference identifier for the stripped data content;
   conveying the message over a wireless network infrastructure,
wherein said recomposed message is resolvable at the destination mobile device by replacing the reference identifier with the stripped data content retrieved from the shared data server.

7. The method of claim 6, wherein the checking step checks for attachments of a predetermined format.

8. The method of claim 1, wherein generating said reference identifier further includes shared data server steps of:
   recognizing a particular data form of a data content subset as that of a data application executable on one side of the mobile devices;
   converting the data content subset into a relevant format for the data application; and
   storing the data content subset.

9. The method of claim 1 further comprising:
   generating the data content via said sending data application; and
   synchronizing said data content with the shared data server.

10. A mobile device for conveying data content stored in a shared data server, the mobile device comprising:
   a communications subsystem for communicating with components of a wireless network infrastructure;
   a user interface configured to enable interaction with a data application;
   a processor interacting with said user interface and said communications subsystem;
   an electronic mail application adapted to run on said processor;
   memory configured to be accessed by said electronic mail application and said data application, said memory being configured to store data content reference identifiers for data content of said data application, said data reference identifiers being generated by, and identifying the data content stored on, the shared data server remote from said mobile device; and
   said data application being configured to run on said processor and configured to interact with said electronic mail application to send application outgoing data content in an outgoing electronic mail message, said email application being configured to replace outgoing data content in said outgoing electronic mail message with a first data reference identifier, said electronic mail application being further configured to receive an incoming electronic mail message with a second reference identifier and further configured to pass the second reference identifier to said data application,
wherein said data application is configured to display data obtained from the data server upon selection of the data within the data application.

11. The mobile device of claim 10, wherein said data application is a memorandum application and the data content is a memorandum.

12. The mobile device of claim 10, wherein the data application is configured to access an address book in said electronic mail application.

13. The mobile device of claim 10, wherein the memory is a flash type memory.

14. The mobile device of claim 13, further comprising a garbage collector, said garbage collector being configured to periodically clean said data content from said memory, leaving only said data reference identifier.

15. The mobile device of claim 14, further comprising a synchronization application, said synchronization application being configured to synchronize said mobile device and said data server through said communications subsystem.

16. The mobile device of claim 10, further comprising a short range communications system, said short range communications system being configured to allow synchronization of said mobile device with said data server.

* * * * *